(12) United States Patent
Russo et al.

(10) Patent No.: US 8,205,460 B2
(45) Date of Patent: Jun. 26, 2012

(54) BATCH FREEZER WITH CLEANING SYSTEM

(75) Inventors: Flavio Russo, Parma (IT); Bruno Sadi Henri Delande, Marseille en Beauvaisis (FR)

(73) Assignee: Nestec S.A., Vevey (CH)

( * ) Notice: Subject to any disclaimer, the term of this patent is extended or adjusted under 35 U.S.C. 154(b) by 541 days.

(21) Appl. No.: 12/447,561

(22) PCT Filed: Nov. 8, 2007

(86) PCT No.: PCT/EP2007/062025
§ 371 (c)(1),
(2), (4) Date: Apr. 28, 2009

(87) PCT Pub. No.: WO2008/068124
PCT Pub. Date: Jun. 12, 2008

(65) Prior Publication Data
US 2010/0058772 A1    Mar. 11, 2010

(30) Foreign Application Priority Data
Dec. 8, 2006 (EP) .................................. 06125736

(51) Int. Cl.
*F25C 1/18* (2006.01)
(52) U.S. Cl. .............................. 62/68; 62/303
(58) Field of Classification Search ............ 62/1, 68, 62/303, 342, 343; 426/519, 524; 99/452, 99/455
See application file for complete search history.

(56) References Cited

U.S. PATENT DOCUMENTS

| | | | | |
|---|---|---|---|---|
| 3,763,768 A * | 10/1973 | Norin | | 99/483 |
| 4,324,108 A * | 4/1982 | Billett et al. | | 62/345 |
| 4,548,054 A * | 10/1985 | Levine | | 62/342 |
| 4,583,863 A * | 4/1986 | Pandolfi | | 366/149 |
| 4,848,381 A * | 7/1989 | Livingston et al. | | 134/57 R |
| 4,860,550 A * | 8/1989 | Aoki et al. | | 62/135 |
| 4,910,973 A * | 3/1990 | Osrow et al. | | 62/342 |
| 5,025,840 A * | 6/1991 | Tacke | | 141/253 |
| 5,149,551 A * | 9/1992 | Anderson | | 426/231 |
| 5,433,084 A | 7/1995 | Kaiser et al. | | |
| 5,556,000 A * | 9/1996 | Covington et al. | | 221/150 A |
| 5,713,209 A * | 2/1998 | Hunchar et al. | | 62/68 |
| 5,845,512 A * | 12/1998 | Chase et al. | | 62/343 |
| 6,553,779 B1 | 4/2003 | Boyer et al. | | |
| 6,637,214 B1 * | 10/2003 | Leitzke et al. | | 62/68 |

FOREIGN PATENT DOCUMENTS
EP    1716760    11/2006

OTHER PUBLICATIONS

International Search Report from International Patent Application No. PCT/EP2007/062025 mailed Apr. 11, 2008.
Written Opinion from International Patent Application No. PCT/EP2007/062025 mailed Apr. 11, 2008.

* cited by examiner

*Primary Examiner* — Mohammad Ali
(74) *Attorney, Agent, or Firm* — K&L Gates LLP

(57) ABSTRACT

A batch freezer for frozen food products comprises — a freezing cylinder, — a dasher designed to propel the product toward a discharge port of the cylinder, and — ma refrigeration unit arranged for cooling the cylinder, wherein the discharge port can be selectively connected to a cleaning pipe leading from the discharge port into the casing of the batch freezer.

18 Claims, 4 Drawing Sheets

BATCH FREEZER WITH CLEANING SYSTEM

Figure 1:
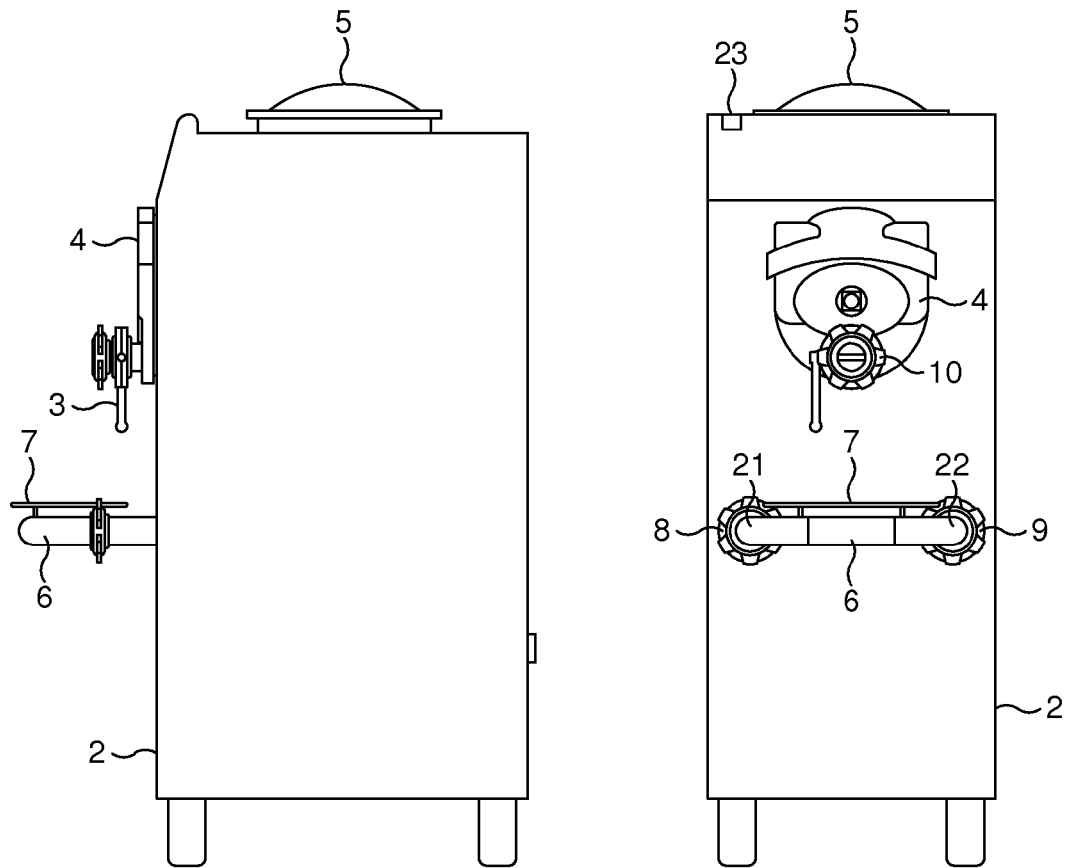
Figure 1:
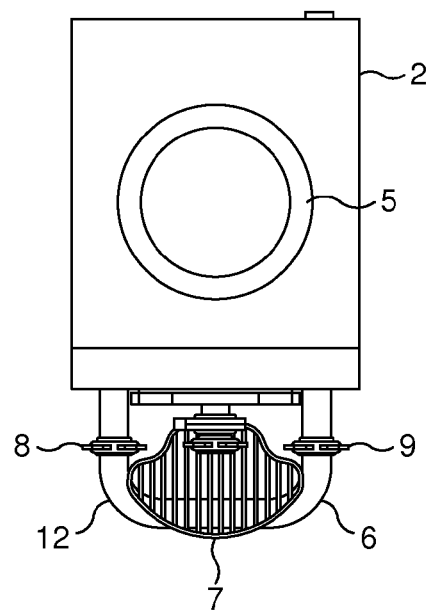

The present invention relates to a batch freezer for frozen confectionery such for example ice cream.

The invention also relates to a system for producing frozen confectionery at a vending site as well as a method for operating a batch freezer for frozen food products.

Batch freezers are known from the prior art. A general introduction can be found e.g. in the standard literature such as e.g. "Ice cream", fifth edition, Arbuckle et al.

Usually such that freezers are used for small-scale production of e.g. ice cream and are usually located on small-scale production sites which are not visible to the user.

While the ice cream production which such a batch freezer does not have an unaesthetic aspects, it has to be noted that after a certain period of use of a batch freezer or after changing the ice cream flavor to be produced, the batch freezer has to be thoroughly cleaned and eventually sterilized. This process includes the drainage of waste water which is not aesthetically appealing to a potential consumer at a vending site. Thus the cleaning process for known batch freezers could be an obstacle against using in sight of a potential consumer and by the way represent a complex manual operation.

Thus it is the object of the present invention to propose a batch freezer which is designed to allow for a cleaning process in such a manner that it can carried out even at a vending site (vending parlor) and visible to a potential consumer in a way that simplify all the manual cleaning operations normally done for batch freezers.

A further object is to provide a batch freezer which can be cleaned without the need of a water pump, and does not need water supplied at high pressure.

This object is achieved by means of the features of the independent claims.

The dependent claims develop further the central idea of the present invention.

According to a first aspect of the present invention a batch freezer for frozen confectionery is proposed. The batch freezer comprises a freezing cylinder which usually is oriented in a horizontal position. A dasher is arranged inside the freezing cylinder and is designed to propel the product to water discharge port of the freezing cylinder. Finally, a refrigeration unit is arranged for cooling the cylinder during the freezing process for the food product. According to the present invention the discharge port of the freezing cylinder can be selectively connected to a cleaning pipe leading from the discharge port into the casing of the batch freezer. Thus, during a cleaning (rinsing) process of the freezing cylinder, waste water will be drained from the freezing cylinder through the discharge port (which is arranged at an outer phase of the casing of the batch freezer) and is then fed back into the casing of the batch freezer trough the cleaning pipe. Obviously, in case the cleaning pipe is made of a non-transparent material such as for example stainless steel, the waste water will not be visible such that the cleaning process using a cleaning pipe according to the present invention can even be carried out when the batch freezer is placed at a vending site and in plain view of potential consumers.

The cleaning pipe can present a first external section which externally connects the discharge port with a second, internal section of the cleaning pipe, wherein the second, internal section is arranged inside a casing of the batch freezer.

The internal can comprise a siphon pipe in order to suppress odors coming from the drain.

The first external section of the cleaning pipe can have one open end which can be selectively tightly connected to the discharge port.

The second, internal section of the cleaning pipe is preferably fixedly mounted inside the casing of the batch freezer.

The first, external section of the cleaning pipe can be designed to be rotatable around an axis going through the connection portion of the first, external section to the second, internal section of the cleaning pipe.

The first, external section of the cleaning pipe can be mounted in a rotatable manner, such that it can be rotated between an essentially horizontal stand-by orientation and an orientation in which can be connected to the discharge port of the batch freezer.

The first, external section of the cleaning pipe can be bend, such that it can be designed to serve as a support when in the horizontal position. To this regard an additional grill, plate or other support structure can be fixed to the bend first section of the cleaning pipe.

A water inlet can be provided on top of the freezing cylinder in order to feed preferably hot water to the freezing cylinder when carrying out a rinsing and cleaning of the freezing cylinder. Preferably, the batch freezer is without a water pump.

Preferably the cleaning pipe exits the body (casing) of the batch freezer at it's rear side such that this acid and the corresponding discharge of waste water is not visible from the front of the batch freezer.

The present invention also relates to a system for producing frozen food products, such as for example ice cream at a vending site. The system comprises a batch freezer as well as a package of a batch of a ready-to-freeze liquid ingredient mix for the frozen food product.

The batch freezer can be provided with means for identifying a supplied ingredient mixed package, e.g. in order to control a subsequent frozen food production process depending on the information on the identity of the ingredient mix.

Finally, the present invention also relates to a method for operating a batch freezer. In a first step a package of a batch of a ready-to-freeze liquid ingredient mix for a frozen food product, such for example ice cream, sorbet etc. is provided.

The liquid ingredient mix is then fill from the package into a freezing cylinder to batch freezer.

The liquid mix is frozen and then discharged from a discharge port of the freezing cylinder. Then the discharge port is connected to a cleaning pipe of the batch freezer, the cleaning pipe connecting the discharge port externally to an internal section of the cleaning pipe. Finally the freezing cylinder can be cleaned by rinsing it with hot water, which is then discharged to the cleaning pipe.

The method can comprise the step of operating a dasher of the batch freezer once the freezing cylinder is at least partially filled with water in order to thoroughly clean dasher and/or the freezing cylinder.

The freezing cylinder can be selectively connected to a hot water inlet. The hot water supply does not need to be under pressure for the cleaning operation to be effective.

The batch freezer can identify a supplied ingredient mix package in order to control a subsequent freezing operation depending on the identified information.

Further advantages, features and objects of the present invention will become evident for the skilled person when going through the following detailed explanation of embodiments of the present invention, when taken in conjunction with the figures of the enclosed drawings.

Figure 2:
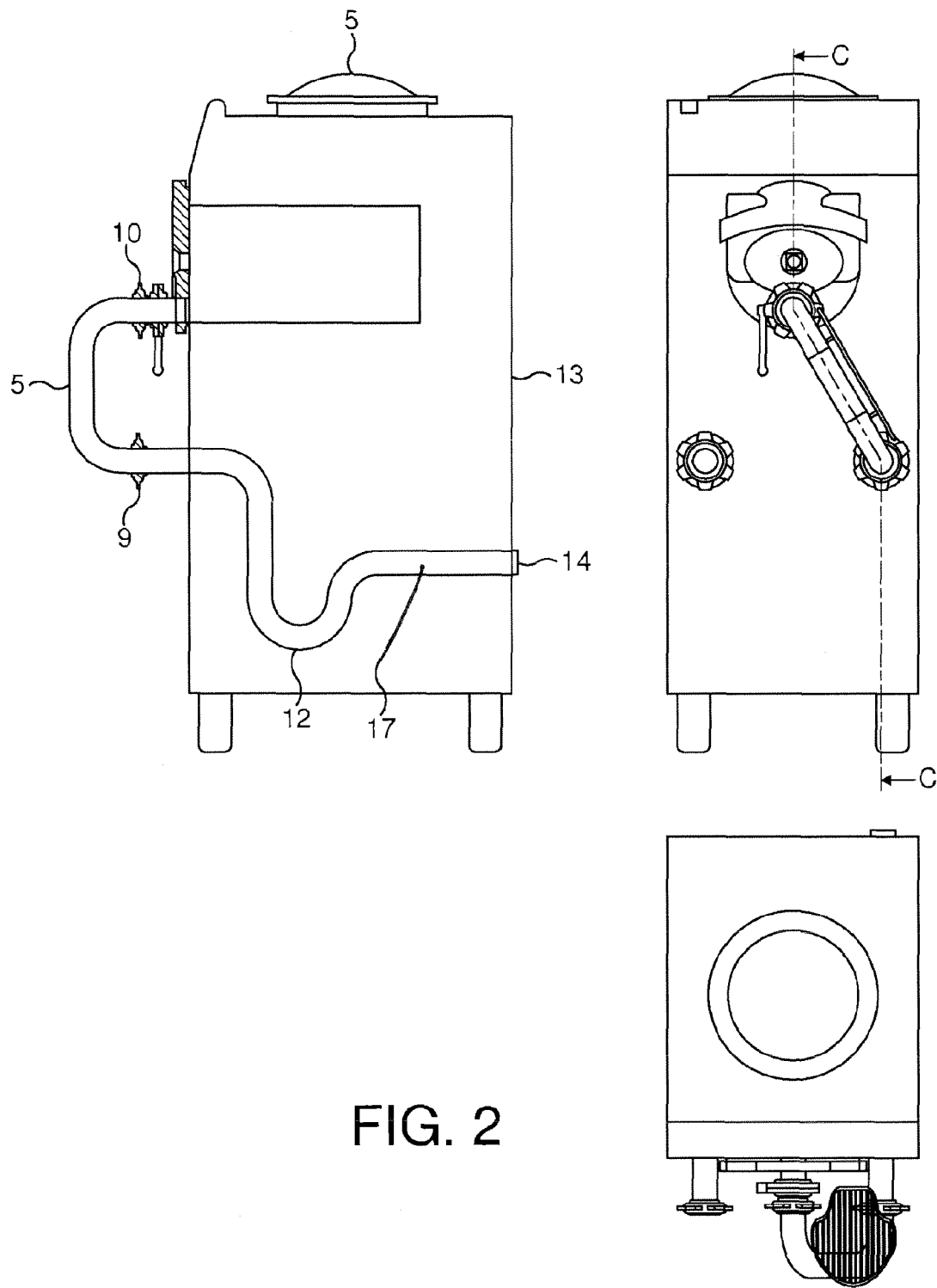
Figure 3:
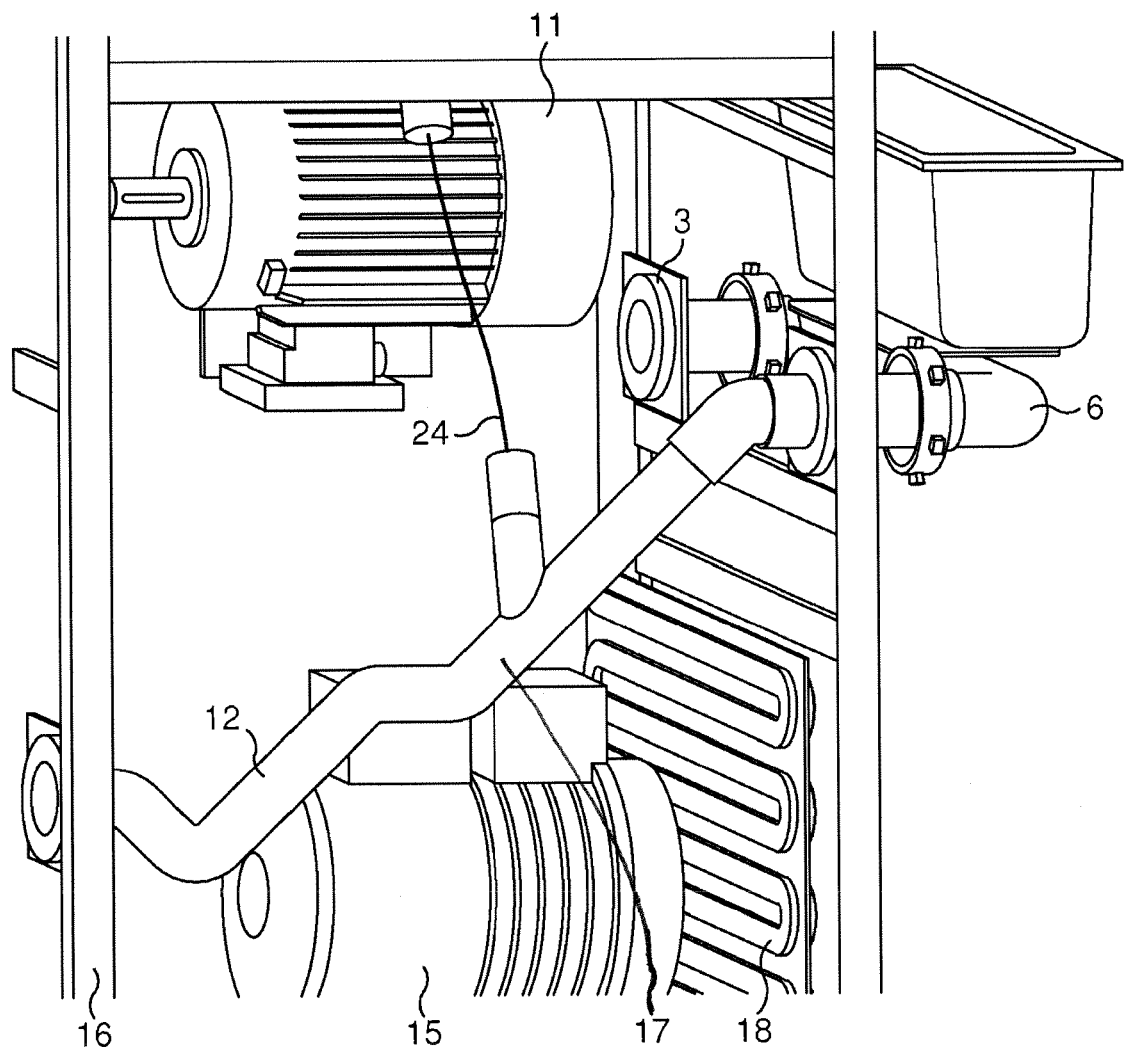
Figure 4:
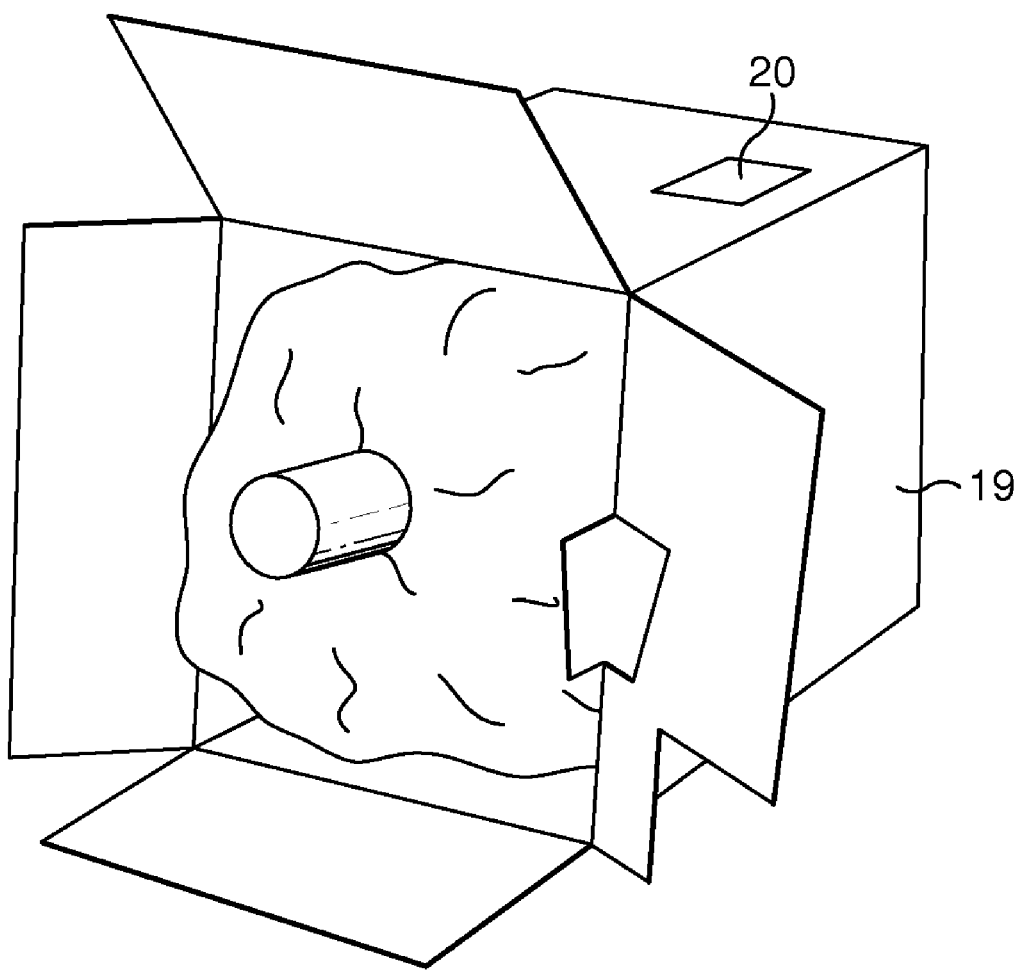

FIG. 1 shows the side view, a front view and a top view of a batch freezer according to the present invention in the frozen food processing phase, FIG. 2 shows the freezer of FIG. 1 in a status in which it can be cleaned, FIG. 3 shows an internal view of parts of the freeze according to the present invention, and FIG. 4 shows a package which can be used together with a freeze according to FIGS. 1 to 3.

FIG. 1 shows a batch freezer 1 for production of frozen confectionery products, such for example ice cream.

The ingredients can be loaded, preferably in a liquid state, into a freezing cylinder 11 (see FIGS. 2 and 3) from the top of the batch freezer 1 through a top opening 5 which communicates with the freezing cylinder 11.

At the front side of the casing 2 of the batch freezer 1 there is arranged a door 4 for access to the freezing cylinder 11, the door being provided with a valve 3, such as for example a butterfly valve for selectively closing of the interior of the freezing cylinder 11.

As usually, a dasher, which is not shown in the drawings, can be arranged inside the freezing cylinder 11 to propel the frozen product towards the door 4 when in operation.

On the front side of the batch freezer 1 there is also arranged a section 6 of a cleaning pipe which, in the position of FIG. 1, is arranged in a horizontal position such that it can act as a horizontal support stand. To this regard a grill or plate 7 can be attached (e.g. by welding) to the external section 6 of the cleaning pipe. The section 6 of the cleaning pipe is fixed to the casing 2 via two nods 8, 9.

Preferably the external section 6 is made from a non-transparent material such as e.g. stainless steel.

As will be explained later on with reference to FIG. 2, the end 21 of the cleaning pipe is and open end attached to the nod 8, while the other end 22 of the bent, external section 6 of the cleaning pipe communicates with a further, internal section of the cleaning pipe. The external section 6 is mounted in a rotatable manner vis-á-vis the casing of the batch freezer 1 and the internal section 17 of the cleaning pipe.

In the state of the batch freezer as shown in FIG. 2 ice cream can be produced inside the freezing cylinder 11, wherein the freezing cylinder is cooled by a refrigeration unit as it is generally known from the prior art. At it is also known, a dasher can propel the product produced in the freezing cylinder 11 towards to the discharge port 3. Upon opening the valve of the discharge port 3 the produced frozen confectionery product can be obtained from the batch freezer.

After a defined period of time of use of the batch freezer 1 or every time when changing the flavor of the product to be produced in the batch freezer 1, all parts of the batch freezer which have been in contact with the frozen product have to be cleaned.

In order to carry out the cleaning process, the batch freezer 1 is transferred from the operation state as shown in FIG. 1 to the cleaning as shown in FIG. 2.

Essentially the bend portion 6 of the cleaning pipe is rotated (in the clockwise sense in the shown example) such that the open end 21 of the bend section 6 is tightly connected to the discharge port 3 via a nod nipple 10.

As can be seen from FIG. 2, the second end 22 of the bend, external section 6 of the cleaning pipe remains in communication with the internal section 17 of the cleaning pipe. The second, internal section 17 can provide a siphon section 12 and will usually acid the casing 2 of the batch freezer 1 at a rear side 13 of the casing 1.

The internal section 17 is also preferably made from stainless steel.

FIG. 3 shows parts of the batch freezer 1 of FIGS. 1 and 2, wherein among others, the casing is taken off for better illustrations.

In FIG. 3 the refrigeration unit 15 and a heat exchanger unit 18 can be seen.

The external section 6 of the cleaning pipe is connected to the discharge port 3 and communicates with the internal section 17 of the cleaning pipe.

As can been seen from FIG. 3, a direct connection 24 from this cleaning pipe 17 to the freezing cylinder 11 can be provided, shunting the external section 6 and being designed for a cleaning of the dash pinion.

The batch freezer as one as shown in the FIGS. 1 to 3 is particularly suited to be used in combination with a package 19 (see FIG. 4) containing a liquid ready-to-freeze ingredient mix for the frozen confectionery product to be produced. This is sometimes called a "bag-in-box" package. The package can be initially sealed by a membrane, which membrane is opened when fixing the package at the top loading mechanism 5, which can be provided to this regard with a perforation member.

The top loading mechanism 5 can be provided with a connection insert in order to attach the package 19.

Preferably the batch freezer 1 is provided with detecting means (23 in FIG. 1) which are in functional connection with control means for the operation of the batch freezer 1.

Correspondingly the package 19 (see FIG. 4) can be provided with identification-carrying means 20 (such as for example a RFID tag etc.) such that the sensing means 23 of the batch freezer 1 can read identification information from the package 19 in a wireless or a non-wireless manner. Thus the confectionery frozen product production operation of the batch freezer 1 can be controlled depending on the read identification information from the package 19. E.g. operation parameters (time, temperature, operation of the dasher etc.) can be set depending on the read identification information. Additionally alternatively the operation of the batch freezer 1 can only be enabled in case the correct associate information can read from the package 19 in order to prevent the use of the batch freezer 1 with ingredients which are not adapted for the batch freezer 1.

A batch freezer 1 as shown in FIGS. 1 to 3 can even be installed at vending parlors. The batch freezer can be designed to produce 1 to 3 ice cream trace (of 5 liters each) during the day. The batch freezer 1 can be cleaned, preferably by rinsing it with hot water, at the each different each cream flavor production. In case the batch freezer 1 is installed in a vending side, the cleaning has to be done in front of a potential consumer.

For the cleaning (rinsing) operation the top loading mechanism 5 for the ice cream ingredients can be used for as a hot water inlet. Thus also the top loading mechanism 5 can be cleaned.

As will be explained in the following, the freezer cylinder 11 can be connected to the cleaning pipe in very short time and the waste water can be collected to the drain without disadvantageous aesthetic effects.

The inner cleaning type section 17 is fixedly installed inside the freezer body (casing) 2. The cleaning pipe is preferably made from stainless steel. The external cleaning pipe section 6 with bents and unions extremities is arranged at the front of the batch freezer 1. One union 22 is connected to the internal pipe section through a nod nipple 9, while the other one (open end) is connected to a fix union (nod nipple 8 in FIG. 1).

The distance between the nod nipple 8 and the nod nipple 9 corresponds to the distance of the nod nipple 9 to the nod nipple 10 of the discharge port 3.

Then, the cleaning process can be carried out as following:

The ice cream nozzle is completely detached (unscrewed) from the door 4.

The nozzle can then be cleaned separately in a cleaning tank.

The nod nipple 8 is completely unscrewed from a fix support on the casing 2 of the batch freezer 1.

The nod nipple 9 is partially unscrewed (lucent) and then the external pipe section 6 can be rotated e.g. by 60° in the clockwise direction.

The nod nipple 8 can then be completely (tightly) screwed on the nozzle screw 10.

The valve 3 of the discharge port is closed.

Hot water can be supplied to the freezing cylinder 11 through the top loading mechanism 5. Optionally then the dasher rotation can be started.

When the freezing cylinder 11 has been filled with water, the valve 3 can be opened in order to discharge waste water through the cleaning pipe.

Then the hot water inlet can be closed and the cleaning pipe can be unconnected.

The cylinder door 4 can be opened and the dasher can be cleaned and the cylinder can be tried.

The freezer 1 is then ready to start a new ice cream production process.

As it is shown in FIGS. 1 and 2, a stainless steel support 7 can be welded to the external pipe section 6. During ice cream production, this support can be used as a container support.

This cleaning operation can be carried out without the need for a water pump, without water at high pressure, but simply by pouring hot water into the freezing cylinder through the top lid of the loading mechanism.

The invention claimed is:

1. A batch freezer for frozen food products, comprising
a freezing cylinder;
a dasher designed to propel a product toward a discharge port of the cylinder;
a refrigeration unit arranged for cooling the cylinder; and
the discharge port being selectively connected to a cleaning pipe leading from the discharge port into a casing of the batch freezer.

2. The batch freezer according to claim 1, wherein the cleaning pipe comprises a first external section which externally connects the discharge port with a second, internal section located inside the casing of the batch freezer.

3. The batch freezer according to claim 2, wherein the internal section comprises a siphon pipe.

4. The batch freezer according to claim 2, wherein the first external section of the cleaning pipe has an open end which can be selectively tightly connected to the discharge port.

5. The batch freezer according to claim 2, where the second, internal section of the cleaning pipe is fixedly mounted inside the casing of the batch freezer.

6. The batch freezer according to claim 2, wherein the first, external section of the cleaning pipe can be rotated.

7. The batch freezer according to claim 1, wherein a hot water inlet is located on top of the freezing cylinder in order to rinse the freezing cylinder with hot water.

8. The batch freezer according to claim 1, wherein the cleaning pipe exits the casing of the batch freezer at its rear.

9. A system for producing frozen food products at a vending site, comprising:
a batch freezer comprising a freezing cylinder, a dasher designed to propel a product toward a discharge port of the cylinder, a refrigeration unit arranged for cooling the cylinder, and the discharge port being selectively connected to a cleaning pipe leading from the discharge port into a casing of the batch freezer; and
a package of a batch of a ready-to-freeze liquid ingredient mix for the frozen food product.

10. A method for operating a batch freezer, comprising the steps of:
providing a package of a batch of a ready-to-freeze liquid ingredient mix for a frozen food product;
filling the liquid ingredient mix from the package into a freezing cylinder of a batch freezer;
freezing the mix and discharging the frozen product from a discharge port of the freezing cylinder;
connecting the discharge port to a cleaning pipe of the batch freezer; and
cleaning the freezing cylinder by rinsing it with hot water which is then drained through the cleaning pipe.

11. The method according to claim 10, comprising the step of operating a dasher of the batch freezer once the freezing cylinder is at least partially filled with water.

12. The method according to claim 10, wherein the freezing cylinder can be selectively connected to a hot water inlet.

13. The method according to claim 10, wherein the batch freezer identifies a supplied ingredient mix package.

14. A batch freezer comprising
a freezing cylinder;
a dasher so constructed and arranged to move a product toward a discharge port of the cylinder;
a refrigeration unit; and
the discharge port being connected to a cleaning pipe leading from the discharge port to a casing of the batch freezer.

15. A batch freezer for frozen food products, comprising
a freezing cylinder;
a dasher designed to propel a product toward a discharge port of the cylinder;
a refrigeration unit arranged for cooling the cylinder; and
the discharge port being selectively connected to a cleaning pipe leading from the discharge port into a casing of the batch freezer, wherein the cleaning pipe comprises a first external section that externally connects the discharge port with a second, internal section located inside the casing of the batch freezer, and wherein the first, external section of the cleaning pipe can be rotated between an essentially horizontal stand-by orientation and an orientation in which the first, external section can be connected to the discharge port of the batch freezer.

16. A batch freezer for frozen food products, comprising
a freezing cylinder;
a dasher designed to propel a product toward a discharge port of the cylinder;
a refrigeration unit arranged for cooling the cylinder; and
the discharge port being selectively connected to a cleaning pipe leading from the discharge port into a casing of the batch freezer, wherein the cleaning pipe comprises a first external section that externally connects the discharge port with a second, internal section located inside the casing of the batch freezer, and wherein the first section of the cleaning pipe is bent and designed to serve as a support when in a horizontal position.

17. The batch freezer according to claim 16, wherein a grill is fixed to the bent first section of the cleaning pipe.

18. A system for producing frozen food products at a vending site, comprising:
a batch freezer comprising a freezing cylinder, a dasher designed to propel a product toward a discharge port of the cylinder, a refrigeration unit arranged for cooling the cylinder, and the discharge port being selectively connected to a cleaning pipe leading from the discharge port into a casing of the batch freezer, wherein the batch freezer comprises means for identifying a supplied ingredient mix package; and a package of a batch of a ready-to-freeze liquid ingredient mix for the frozen food product.

* * * * *